Patented Aug. 7, 1934

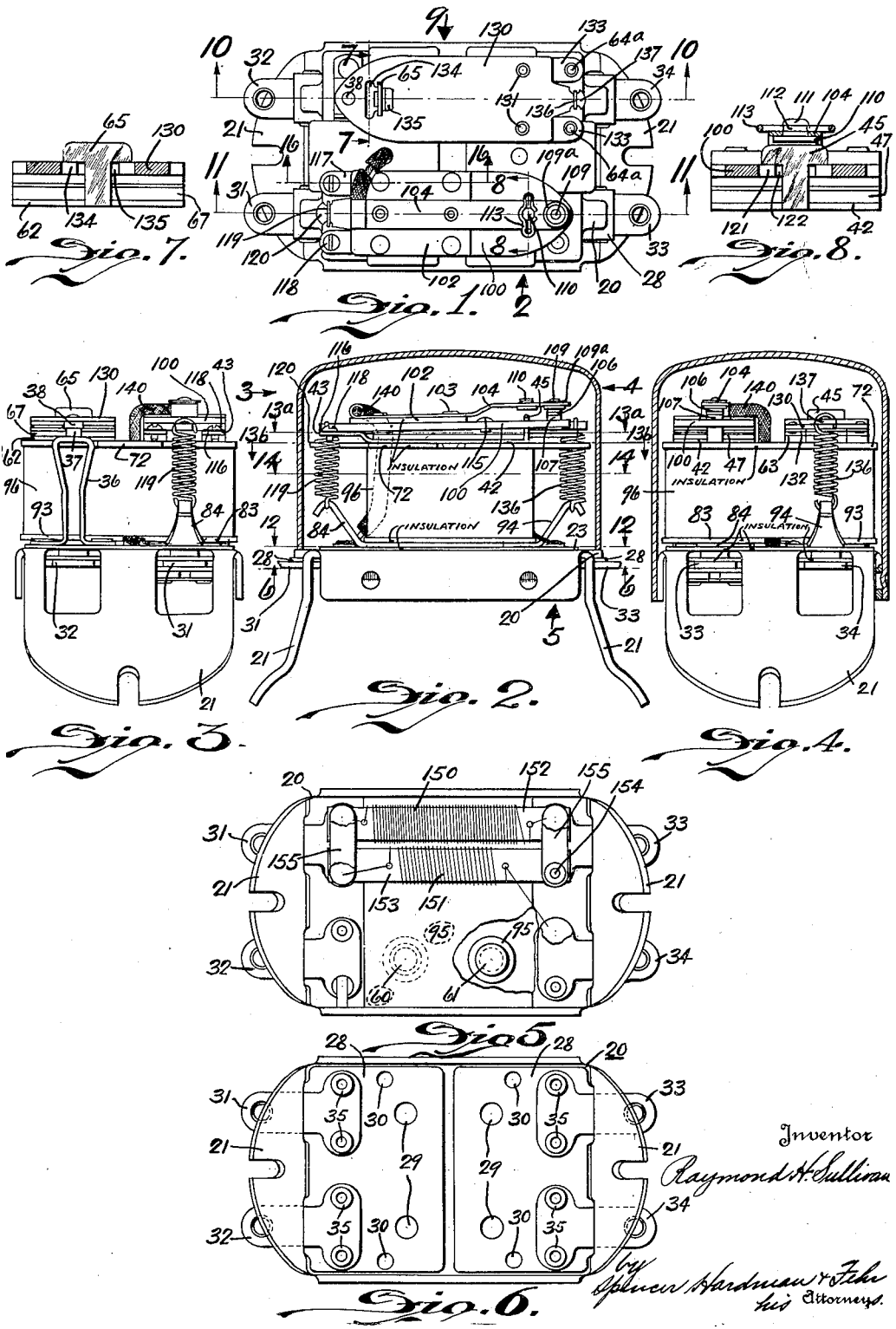
Aug. 7, 1934.   R. H. SULLIVAN   1,968,971
GENERATING AND BATTERY CHARGING SYSTEM
Filed May 29, 1930   3 Sheets-Sheet 1
Inventor
Raymond H. Sullivan
by Spencer Hardman & Fehr
his Attorneys

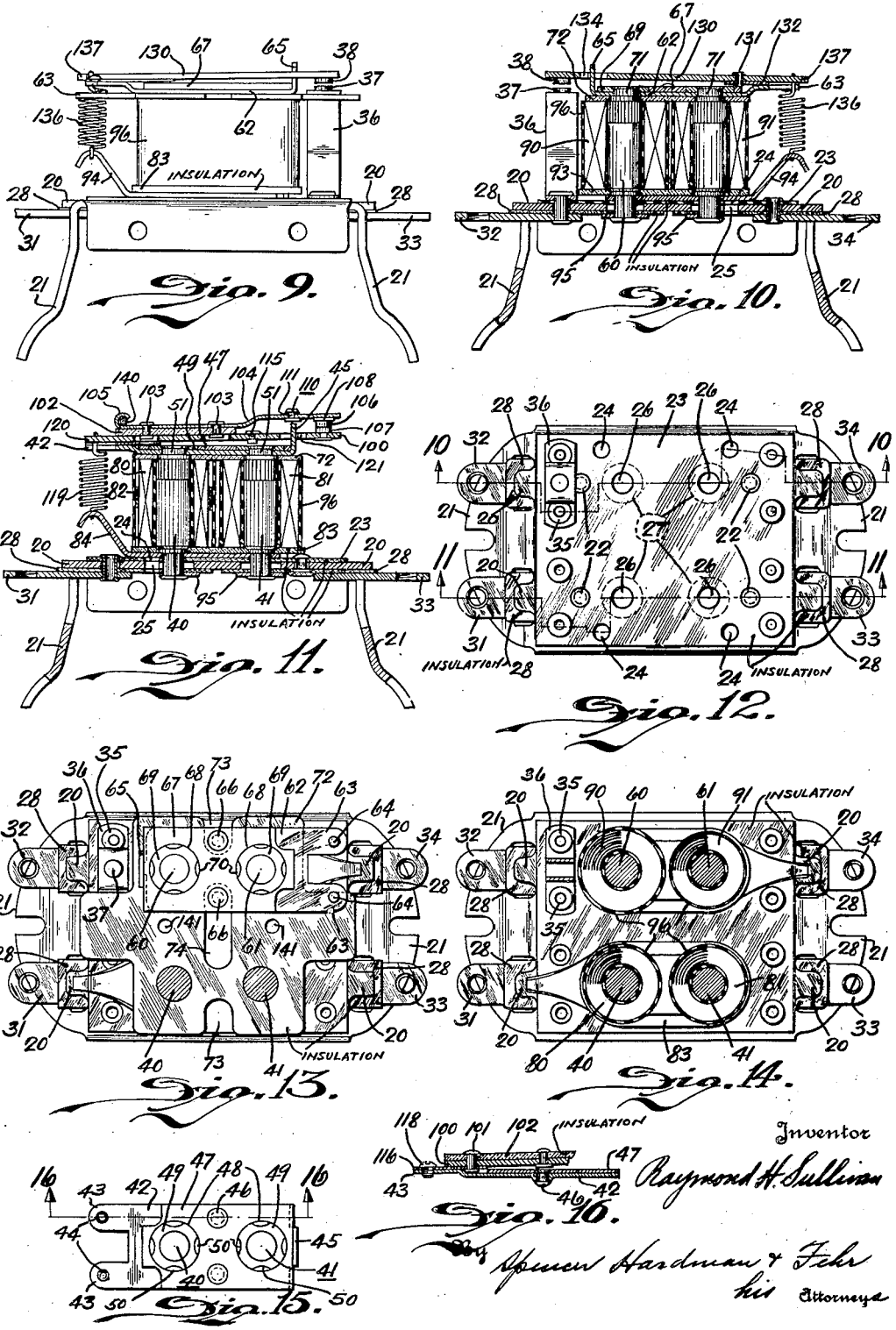

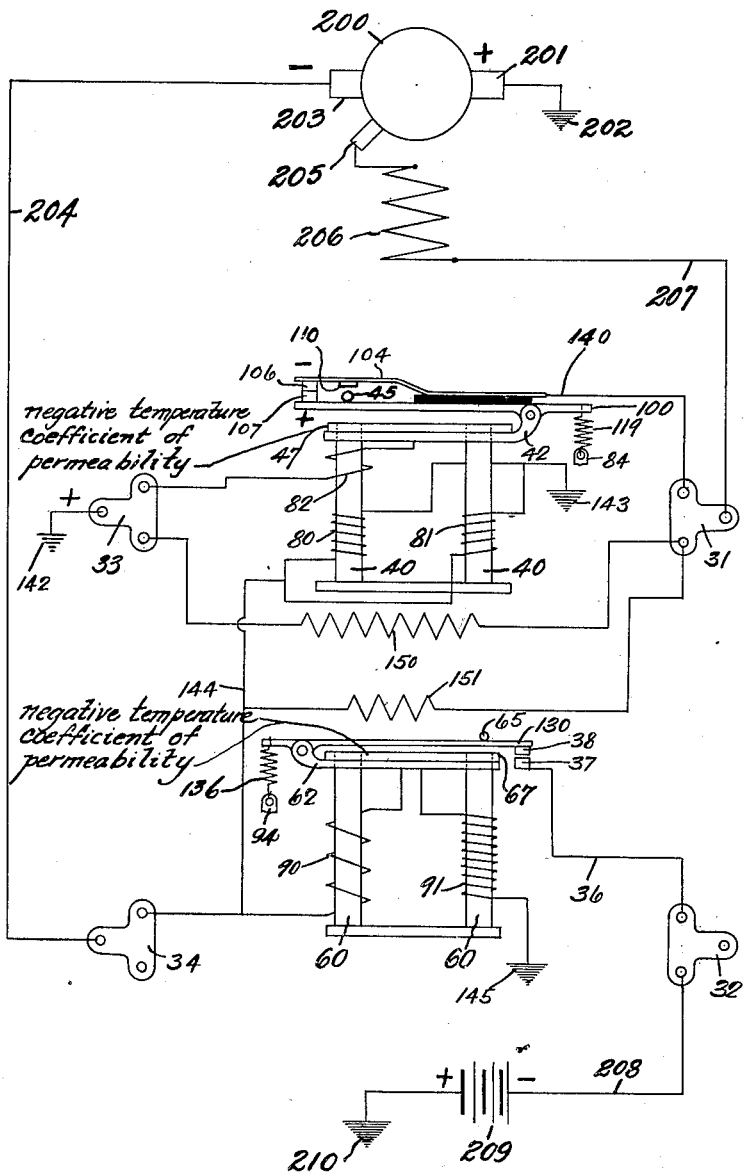

1,968,971

UNITED STATES PATENT OFFICE 1,968,971

GENERATING AND BATTERY CHARGING SYSTEM

Raymond H. Sullivan, Rochester, N. Y., assignor to North East Appliance Corporation, Rochester, N. Y., a corporation of New York Application May 29, 1930, Serial No. 457,112

4 Claims. (Cl. 171—313)

This invention relates to apparatus for controlling an electrical system comprising a variable speed generator and a storage battery charged thereby.

One of the objects of the invention is to provide a relay for automatically connecting the generator with the battery when the generator voltage has attained a certain value and to disconnect the battery from the generator when the generator voltage falls substantially below this value, the relay operating at the predetermined voltage regardless of temperature change.

A further object of the invention is to improve the type of generator voltage regulator which automatically regulates the field current of the generator in order that the generator voltage will remain substantially constant regardless of variations of generator speeds over a relatively wide range and regardless of the state of battery charge. In this way the battery charge rate decreases as the amount of battery charge increases. One of these improvements is to make the regulator responsive to temperature in order to regulate at a higher voltage as the temperature decreases in order that the battery charge rate may be higher on the average in colder weather than in warmer.

It is a further object to provide for a rapid and vigorous action of the vibrating element of the regulator so that the regulator will be sensitive to variations in speed.

A further object is to provide a regulator in which there is less tendency for the contacts to stick together.

A still further object is to provide a regulator which will prevent a dangerous increase of voltage in case the battery circuit is accidentally opened.

A further object is to provide a regulator having long contact life, and this is obtained by providing a regulator which permits for regulation over a relatively great speed range of generator speed for a comparatively low value of the main regulating resistance of the regulator.

Another object of the invention is to provide a unitary structure comprising the relay and regulator embodying the present invention, as stated in the two preceding paragraphs.

Further objects and advantages of the present invention will be apparent from the following description, reference being had to the accompanying drawings, wherein a preferred embodiment of one form of the present invention is clearly shown.

In the drawings:

Fig. 1 is a plan view of a relay and regulator unit embodying the present invention.

Fig. 2 is a side view thereof taken in the direction of the arrow 2 in Fig. 1, the cover for the unit being shown in section.

Fig. 3 is an end view looking in the direction of the arrow 3 in Fig. 2, with the cover being removed.

Fig. 4 is an end view taken in the direction of the arrow 4 of Fig. 2 with the cover shown in section.

Fig. 5 is a bottom view taken in the direction of the arrow 5 of Fig. 2.

Fig. 6 is a bottom view of the base sub-assembly, omitting the parts shown in Fig. 5.

Fig. 7 is a fragmentary sectional view on line 7—7 of Fig. 1 and is drawn to a larger scale.

Fig. 8 is a fragmentary sectional view on line 8—8 of Fig. 1.

Fig. 9 is a side elevation looking in the direction of the arrow 9 of Fig. 1.

Fig. 10 is a sectional view on line 10—10 of Fig. 1 and Fig. 12.

Fig. 11 is a sectional view on line 11—11 of Fig. 1 and Fig. 12.

Fig. 12 is a plan view of the base sub-assembly and shows the side opposite that shown in Fig. 6.

Fig. 13 is a plan view partly in section, the upper half of this view being a plan view in case parts above the line 13a—13a of Fig. 2 were omitted, and the lower half of this view being a sectional view on line 13b—13b of Fig. 2.

Fig. 14 is a sectional view on the line 14—14 of Fig. 2.

Fig. 15 is a plan view of an assembly comprising a magnetic shunt compensator and armature hinge supporting bracket.

Fig. 16 is a fragmentary sectional view taken on the line 16—16 of Figs. 1 and 15.

Fig. 17 is a wiring diagram illustrating the use of the present invention.

The relay and regulator unit comprises chiefly four subassemblies,—a base subassembly, a magnet subassembly and two armature subassemblies. The magnet subassembly comprises an assembly of electromagnets of the relay and of the regulator, this subassembly being attached to the base subassembly by riveting thereto the central cores of electromagnets. The armature subassemblies are then attached to the magnet subassembly.

The base subassembly comprises a base frame 20 having legs 21 by which the base may be attached to a support such as the cylindrical frame of a dynamo electric machine. Rivets 22 secure to the upper side of the base frame an insulating plate 23 having holes 24 in alignment with holes 25 of the same size in the base 20 through which wires may be passed. The plate 23 has holes 26 in alignment with larger holes 27 in the base 20. These holes receive magnet cores, to be described later. Referring to Fig. 6, upon the under side of the base 20 are located two nonconducting plates 28 having holes 29 in alignment with the holes 26 of plate 23 and of the same size. Plate 28 has holes 30 in alignment with holes 24 of plate 23 and of the same size. The plates 28, together with four metallic terminal plates 31, 32, 33 and 34, are attached to the base 20 by tubular rivets 35 passing through aligned holes in the terminal plates insulating plates 28, base 20 and insulating plate 23 is shown particularly in Fig. 10. The holes in base 20 are larger in diameter than the rivets, hence the base 20 is not electrically connected with the terminal plates. The rivets which secure the terminal plate 33 to the base 20 also secure a contact bracket 36 carrying a contact 37.

The magnet subassembly comprises an assembly of two magnet core and armature hinge plate subassemblies, magnet windings and insulating plates placed upon the cores adjacent the ends of the windings. The magnet core and armature hinge plate subassembly for the regulator comprises cores 40 and 41, the upper ends of which are attached to a subassembly including an armature hinge and stop plate 42 having ears 43 provided with threaded holes 44 and having a stop lug 45 which as shown in Fig. 8 is T-shaped in form. The hinge plate 42 is secured by rivets 46 to a magnetic shunt plate 47, the magnetic permeability of which varies with temperature. The plate 47 is provided with two large holes 48 which receive magnetizable washers 49 secured in these holes by staking indicated by numeral 50. The upper reduced ends 51 of the magnet cores 40 and 41 pass through aligned holes in the hinge plate 42 and washers 49 and are riveted over against the washers. The magnet core and armature hinge plate subassembly for the relay comprises cores 60 and 61, the upper ends of which are attached to a subassembly including an armature hinge and stop plate 62 having ears 63 provided with projection 64 integral therewith and adapted to serve as rivets for a purpose to be described, and having a stop lug 65 which, as shown in Fig. 7, is T-shaped in form. The hinge plate 62 is secured by rivets 66 to a magnetic shunt plate 67, the magnetic permeability of which varies with temperature. The plate 67 is provided with two large holes 68 which receive magnetizable washers 69 secured in these holes by staking indicated by numeral 70. The upper reduced end 71 of the magnet cores 60 and 61 pass through aligned holes in the hinge plate 62 and washer 69 and are riveted over against the washer.

These two subassemblies of magnet cores and armature hinge plates for the relay and regulator respectively are assembled together by an insulating plate 72 having holes for receiving the cores 40—41, 60 and 61 and having notches 73 and an oblong hole 74 to provide clearance for the ends of the rivets 46 and 66. Following this assembling together of the armature hinge plate and core subassemblies the regulator magnet coils 80 and 81 previously wound upon forms are placed around the cores 40 and 41 respectively. Before assembling the coil 80 upon the core 40, a form wound coil 82 was assembled upon the coil 80. Following this an insulating plate 83 is placed upon the cores 40 and 41 to insulate the ends of the coils 80 and 81 and to tie the lower ends of the cores 40 and 41 together in proper spaced relation. Then a spring hooked plate 84 is assembled upon the projecting ends of the cores 40 and 41, likewise upon the relay magnet cores 60 and 61 there are placed form wound coils 90 and 91 respectively. An insulating plate 93 and a spring hook plate 94 are assembled upon the lower projecting ends of the cores 60 and 61. Then this assembly of magnet cores, magnet coils, armature hinge plates, magnetic shunts and spring hook plates is attached to the base subassembly by passing the shanks at the lower ends of the cores through the holes 26, 27 and 29 of the parts of the base subassembly, and these shanks are riveted over against the washers 95. All of the coils may then be encased in a wrapping of insulation material, indicated at 96 in Figs. 2, 3, 4 and 9.

The relay armature subassembly comprises a rigid armature plate 100 attached by rivets 101 to an insulating plate 102 (see Fig. 16) which is attached by rivets 103 (see Fig. 11) to a flexible lead spring conductor 104 having a wire receiving hook 105 at one end and carrying at the other a contact 106 which cooperates with a contact 107 carried by the armature plate 100. The contact which is positive is preferably silver and the contact which is negative is tungsten in order to improve contact life. The spring conductor 104 carries a fiber bumper block 110 having a shank 111 passing through a hole in the spring 104 and having a groove 112 which receives a spring clip 113 which detachably secures the bumper block 110 to the spring 104. The contact 106 is welded to a plate 108 having a shank 109 which passes through the spring 104 and is riveted over against a washer 109a located upon the upper side of the spring 104. The armature 100 carries a non-magnetizable rivet 115 which prevents actual contact between the armature 100 and the pole pieces of the magnet provided by the upper ends of the cores 40 and 41. Some of the rivets 101 secure to the armature 100 a leaf spring hinge plate 116 having apertured ears 117 through which screws 118 pass and are threaded into the holes 44 of the ears 43 of the hinge bracket 42. When the armature subassembly is attached to the magnet subassembly in this manner, a spring 119 is attached to the hook plate 42 and to the notched end 120 of the armature 100 and urges the armature 100 in a counter-clockwise direction, as viewed in Fig. 11. Before attaching the armature 100 to the hinge plate 42, the T-shaped lug 45 is passed through an opening 121 in the armature 100 and then the armature 100 is moved edgewise to locate the holes for the screws 118 provided in the hinge plate 116 in alignment with the holes 44 of the bracket 42. When so moving the armature, the shank of the T-shaped lug 45 is located into an opening 122 less in width than the width of the head of the lug 45. Therefore the head of the lug 45 will operate to provide a stop engaging the upper surface of the armature 100 to limit movement of the armature away from the magnet as effected by the spring 119. When the armature is attached to the hinge plate the bumper block 100 will be located above the lug 45 but will be normally spaced therefrom.

The armature subassembly for the cutout relay comprises a rigid armature 130 carrying contact 38 engageable with the contact 37 and attached by rivets 131 to a leaf spring hinge plate 132 having apertured ears 133 which are placed over the projection 64 of the hinge plate ears 63 and are riveted thereto as indicated at 64a in Fig. 1. Before assembling the armature with the armature hinge plate, the armature is first so positioned relative to the hinge plate that the T-shaped lug 65 of the hinge plate may pass through an opening 134 wider than the head of the lug. After having passed the head of the lug 65 through the hole 134 the armature 130 is moved toward the left in order to bring the apertures of the ears 133 of the hinge plate 132 into alignment with the projection 64. In so doing the head of the T-shaped lug 65 is moved out of alignment with the opening 134 while the shank of the lug is moved into an opening 135 less in width than the width of the head of the lug 65. Thus the lug 65 operates as a stop to limit clockwise movement of the armature 130 as viewed in Fig. 10, this movement being effected by a spring 136 attached to the hook plate 94 and to a notched extension 137 of the armature 130.

After the complete assembly has been made of the base subassembly, the magnet subassembly and the two armature subassemblies and springs 119 and 136, the circuits of the relay and regulator unit are completed to the terminal plates 31, 32, 33 and 34 in a manner which can be best described by referring to the wiring diagram shown in Fig. 17. The conductor is connected by wire 140 attached to a hook 105 with the terminal plate 31. The wire 140 passes through a hole 141 in the insulating plate 72 down between the magnet coils and is attached to one of the rivets which is connected with the plate 31. The magnet coil 82 is attached at one end to the armature hinge bracket 42 and at the other to the terminal plate 33 which is grounded on the base 20 as indicated at 142. The windings 80 and 81 are connected in parallel and grounded upon the base 20 as indicated at 143 and are connected at the other end by a wire 144 with the terminal plate 34. The series or coarse winding 90 of the relay is connected at one end with the relay armature hinge bracket 62 and at the other end with the terminal plate 34. The shunt or fine winding of the relay is connected at one end with the relay hinge plate 62 and the other end is grounded on the base 20 as indicated at 145. The regulating resistances 150 and 151 are wound upon non-conducting strips 152 and 153 respectively, as shown in Fig. 5. These strips with the windings thereof are secured to the base of the unit by rivets, one of which is shown at 154. These rivets pass through the tubular rivets 35 which pass through suitable holes in the strips 152 and 153 and also through metal straps 155 and the ends of the rivets are deformed against these straps 155. The ends of the resistance 150 are soldered respectively to the straps 155, thus connecting the resistance 150 with the terminal plates 31 and 33. One end of resistance 151 is connected with terminal 34 and the other with terminal 31 through a strap 55.

The mode of operation of the relay regulator unit is as follows:

Referring to Fig. 17, it will be seen that a generator 200 has a grounded brush 201 connected with ground at 202 and an insulated main brush 203 connected by wire 204 with terminal 34. A third brush 205 of the generator is connected with a shunt field winding 206 connected by a wire 207 with terminal 31. Terminal 32 is connected by wire 208 with a battery 209 grounded at 210. Normally the relay contacts 38 and 37 are separated in order to prevent discharge of the battery 209. As the voltage of the generator increases to a certain amount a magnetic pull effective by the magnet coils 90 and 91 finally overcomes the spring 136 and effects the attraction of the armature 130 to close the contacts 38 and 37. When this occurs the generator 200 will be connected with the battery 209 through the coil 90 and contacts 38 and 37 which will remain closed although there may be variations in generator voltage between certain limits. This is due to the fact that the coil 90 being in series with the battery generator has had its ampere turns materially increased by the closing of the relay contacts. However, when the generator voltage falls below a certain amount causing the battery to discharge through the generator there will be a reversal of current through the winding 90 tending to produce magnetism in opposition to that produced by the coil 91 and resulting in a material lessening of the magnetic attraction upon the armature 130 whereupon the spring 136 will effect the separation of the contact 38 from the contact 37 to prevent discharge of the battery through the generator and winding 91 of the relay. The magnetic shunt 67 having negative temperature coefficient of magnetic permeability is made of a special alloy of nickel and steel and is so constituted that it will cause the relay to operate regardless of temperature to connect the generator with the battery at the same voltage. If the battery is a six-volt battery the relay could be provided with a compensating magnetic shunt 67 which would cause the relay to close its contacts at 6½ volts generator voltage regardless of temperature change. The compensator 67 compensates for increase in resistance of the windings of the relay to increase in temperature. If this were not done, the voltage required to operate to close the relay contacts might be less than the regulated voltage of the generator in warm weather, and the relay would never close.

Normally, the regulator contacts 106 and 107 are in engagement so that the circuit of the shunt field generator includes the following connections: third brush 205, winding 206, wire 207, terminal 31, wire 140, leaf spring conductor 104, contacts 106 and 107, armature 100, armature hinge bracket 42, coil 82, terminal 33, ground connections 142 and 202, brush 201, and armature circuits connected with brush 205 and 201. If the speed of the generator exceeds a certain amount thereby impressing a voltage upon the regulator coils 80 and 81 in excess of a certain value, the armature 100 will be attracted toward the cores 40 against the action of the spring 119 which normally holds the armature against the stop 45. As the armature 100 moves toward the cores 40 the leaf spring conductor 104 tends to follow the armature until movement of the conductor 104 is arrested by the bumper block 110 striking the stop 45. Further movement of the armature 100 toward the cores 40 effects the separation of contact 107 from contact 106. When this occurs the short circuit around the regulating resistance 150 will be interrupted so that the field circuit will then include the following connections: third brush 205, field winding 206, wire 207, terminal 31, resistance 150, terminal 33, ground connections 142 and 202, brush 201 and armature circuits connecting brush 201 with brush 205. The interruption of the short circuit around the resistance 150 will cause the current in the field winding 206 to diminish and hence the voltage impressed upon the windings 80 and 81 to diminish to a value such that spring 119 overcomes the magnetic attraction of the armature 110 and causes the contact 107 to engage the contact 106. When this occurs there will be an increase in current in the field winding 206 and a consequent increase in generator voltage which will cause the regulator contacts to separate again. The cycle of operation of the regulator will be repeated thus causing a rapid vibratory movement of the armature 110 to effect a limitation of generator voltage.

The regulator magnet is provided with a winding 82 of a relatively few turns of relatively coarse wire connected in series with the regulator contacts 106 and 107 and the generator field winding 206. The winding 82 assists the windings 80 and 81 in separating the regulator contacts. When these contacts are separated, the winding 82 is open circuited and thus no longer assists the windings 80 and 81. Hence, immediately following the separation of the contacts, the magnetic influence tending to keep these contacts separated is immediately weakened due to two factors, namely, the reduction in voltage impressed on the windings 80 and 81 and the open circuiting of the winding 82. Hence, the contacts will be closed again upon a reduction of generator voltage sooner than would be possible if the coil 82 were not used. Thus the coil 82 increases the rate of vibration of the regulator. Coil 82 has another advantage in that in case of the sticking of contacts 106 and 107 together coil 82 will materially assist in opening these contacts since coil 82 is subjected to the same current increase as the shunt field 206.

In addition to the main regulating resistance 150, connected in shunt with the regulating contacts 106 and 107, a damping resistance 151 is used. This is connected between one end of the generator field 206 and the insulated main brush 203 by connecting the ends of the resistance 151 with terminals 31 and 34 respectively. This resistance 151 tends to dampen out high frequency oscillations in the shunt field circuit which would tend to cause sparking at the contacts 106 and 107 at the time they are opened and hence tends to prolong the life of these contacts and hence the life of the regulator. By using the damping resistance 151 it is possible to secure regulation over a greater speed range of the generator for comparatively low resistance of the element 150 than would be possible if the damping resistance 151 were not used. This resistance 151 also prevents the generator voltage rising to a dangerous value if the battery circuit is accidentally opened.

The regulator magnetic shunt 47 which has a negative temperature coefficient of magnetic permeability is made of a special alloy of nickel and steel and is so constituted that it will regulate for a higher voltage as temperature decreases. If the regulator is designed for regulating a generator of an automobile the magnetic shunt 47 is preferably constituted so that it will regulate at between 7 and 7½ volts in hot weather and at 9 volts in cold weather. This variation in regulation according to temperature change is desirable since it is necessary to impress a higher voltage upon the battery in cold weather in order to keep it properly charged.

The relay regulator unit is preferably mounted under the engine hood and upon the engine generator so that its temperature will increase somewhat in accordance with the increase in temperature of the generator. When the generator is cold, it is obvious that it can safely carry more current than when hot. When the generator first starts to charge the battery, in the morning for example while the generator is cold, it will begin to charge at 9 volts or some value greater than the minimum depending on outside temperature. As the generator warms up the regulator likewise becomes warmer and operates to diminish the voltage of the generator so that its battery charging rate diminishes as its temperature increases. This warming up period of the generator is, of course, of less duration in summer than in winter which is of course a desirable feature since it operates in a way which tends to protect the generator against overheating and the battery against being overcharged in warm weather whereas in colder weather the radiation from the generator being greater the generator can stand to carry a heavier charging current and the battery can stand taking a heavier charging current for a longer period. These are advantages in accord with the fact that the battery generally requires more charge in colder weather than in warmer due to the fact that the drains on the battery are for engine cranking and for automobile lighting are greater in cold weather.

The voltage temperature compensation characteristics of the regulator are, therefore, of such a nature that the generator tends to charge the battery in the minimum time for a given time of operation of the automotive vehicle equipped with the generating system; thus advantage can be taken of an unusually high setting of generator output without excessively heating the generator or over-charging the battery. A satisfactory alloy for making the magnetic shunts of the relay and regulator is one having the following analysis:

| | Percent |
|---|---|
| Carbon | Max.– .10 |
| Manganese | .050– 1.00 |
| Silicon | Max.– .15 |
| Phosphorus | Max.– .030 |
| Sulphur | Max.– .045 |
| Nickel | 30.25–30.75 |

In the regulator the positive contact 107 is preferably made of silver and the negative contact 106 of tungsten for longest contact life. The bumper block 110 of the regulator armature 100 cooperates with the stop 45 to cause the blade 104 to bend about stop 45 as a fulcrum as the armature 100 moves toward the regulator magnet to separate the contact 107 from the contact 106. Since the armature 100 carrying contact 107 bends about a fulcrum substantially removed from the fulcrum about which the blade 104 supporting contact 106 bends just before contact separation, the contact 106 will teeter or rock upon the contact 107 before separation takes place. This rocking motion tends to allow the contacts to become separated freely and minimizes sticking.

While the form of embodiment of the present invention as herein disclosed, constitutes a preferred form, it is to be understood that other forms might be adopted, all coming within the scope of the claims which follow.

What is claimed is as follows:

1. A generating and battery charging system comprising, in combination, a shunt field generator, a storage battery, and a vibratory voltage regulator for controlling the current in the shunt field and comprising a normally short circuited resistance in series with the shunt field winding, cooperating contacts in the resistance short circuit, a vibratory armature for separating the contacts, an electromagnet for operating the armature and having a coil connected across the main brushes of the generator, and a coil in series with the shunt field which is open circuited when the vibrator contacts open.

2. A generating and battery charging system comprising, in combination, a third brush generator having a field winding and having one terminal of its field winding connected with the third brush, a storage battery, and a vibratory voltage regulator for controlling the current in said field winding and comprising a normally short circuited resistance in series with the field winding, cooperating contacts in the resistance short circuit, a vibratory armature for separating the contacts, an electromagnet for operating the armature and having a coil connected across the main brushes of the generator and a practically non-inductive damping resistance connecting the generator main brush of same polarity as the third brush with the terminal of the field winding which is of opposite polarity.

3. A generating and battery charging system comprising, in combination, a third brush generator having a field winding and having one terminal of its field winding connected with an intermediate or third brush, a storage battery, and a vibratory voltage regulator for controlling the current in said field winding and comprising a normally short circuited resistance in series with the field winding, cooperating contacts in the resistance short circuit, a vibratory armature for separating the contacts, an electromagnet for operating the armature and having a coil connected across the main brushes of the generator and a coil in series with the field winding, and a damping resistance connecting the generator main brush of same polarity as the third brush with the terminal of the field winding which is of opposite polarity.

4. A relay and regulator unit comprising, in combination, a base subassembly including a metal base frame, terminals attached to the underside of the frame and insulated therefrom, a magnet subassembly comprising two pairs of magnet cores having windings thereon, armature hinge brackets, each pair of cores being tied together at one end by attaching to an armature hinge bracket, and all four magnet cores being tied together by a non-conducting plate, the other end of the cores being tied together by the base subassembly, and two armature subassemblies attachable respectively to the armature hinge bracket, each armature subassembly including an armature, a contact supported thereby and a leaf spring hinge connecting the armature with the hinge bracket.

RAYMOND H. SULLIVAN.